US012666139B2

(12) United States Patent
Otsuki et al.

(10) Patent No.: US 12,666,139 B2
(45) Date of Patent: Jun. 23, 2026

(54) IMAGE PROCESSING APPARATUS, IMAGE PROCESSING SYSTEM, IMAGE PROCESSING METHOD, AND IMAGE PROCESSING PROGRAM

(71) Applicant: FUJIFILM Corporation, Tokyo (JP)

(72) Inventors: Tomoki Otsuki, Saitama (JP); Koki Hojo, Saitama (JP); Taku Furubayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

(21) Appl. No.: 18/402,664

(22) Filed: Jan. 2, 2024

(65) Prior Publication Data

US 2024/0137647 A1    Apr. 25, 2024
US 2024/0236481 A9    Jul. 11, 2024

Related U.S. Application Data

(63) Continuation of application No. PCT/JP2022/023584, filed on Jun. 13, 2022.

(30) Foreign Application Priority Data

Jul. 19, 2021    (JP) ................................. 2021-118738

(51) Int. Cl.
*H04N 23/60* (2023.01)
*H04N 23/611* (2023.01)
(Continued)

(52) U.S. Cl.
CPC ........... *H04N 23/64* (2023.01); *H04N 23/611* (2023.01); *H04N 23/634* (2023.01); *H04N 23/698* (2023.01)

(58) Field of Classification Search
CPC .... H04N 23/64; H04N 23/611; H04N 23/634; H04N 23/698; G03B 15/00; G03B 17/18; G03B 37/00
(Continued)

(56) References Cited

U.S. PATENT DOCUMENTS

2010/0321470 A1*  12/2010  Oshima .................. H04N 5/772
                                                                      348/E7.092
2017/0148138 A1*   5/2017  Liu ........................ G06T 3/4038
(Continued)

FOREIGN PATENT DOCUMENTS

JP        2011004340        1/2011
JP        2013115623        6/2013
(Continued)

OTHER PUBLICATIONS

"International Search Report (Form PCT/ISA/210) of PCT/JP2022/023584", mailed on Aug. 23, 2022, with English translation thereof, pp. 1-5.
(Continued)

*Primary Examiner* — Asmamaw G Tarko
(74) *Attorney, Agent, or Firm* — JCIPRNET

(57)    ABSTRACT

An image processing apparatus includes a processor, configured to perform an image acquisition processing of acquiring a plurality of moving images having overlapping imaging ranges, an information acquisition processing of acquiring information on a stitching region to be used for concatenation of the plurality of moving images, an indicator calculation processing of calculating an indicator based on a distance between a subject and a stitching line included in the stitching region, and a warning processing of outputting a warning from an output device based on the indicator.
(Continued)

In the indicator calculation processing, the processor is configured to calculate the indicator based on a size of the subject in the moving image.

16 Claims, 14 Drawing Sheets

(51) Int. Cl.
   *H04N 23/63*          (2023.01)
   *H04N 23/698*        (2023.01)
(58) Field of Classification Search
   USPC .......................................................... 348/36
   See application file for complete search history.

(56)                    References Cited

U.S. PATENT DOCUMENTS

| | | | |
|---|---|---|---|
| 2018/0063426 A1 | 3/2018 | Rissa | |
| 2018/0103196 A1* | 4/2018 | Lee | H04N 23/90 |

| | | | |
|---|---|---|---|
| 2019/0295299 A1* | 9/2019 | Park | H04N 23/45 |
| 2020/0193693 A1* | 6/2020 | Thangaraj | G06T 15/205 |
| 2021/0084278 A1* | 3/2021 | Harviainen | H04N 13/332 |
| 2022/0234753 A1* | 7/2022 | Byrne | H04N 23/51 |
| 2024/0370024 A1* | 11/2024 | Böckem | G05D 1/622 |

FOREIGN PATENT DOCUMENTS

| | | |
|---|---|---|
| JP | 2015084512 | 4/2015 |
| JP | 2018142963 | 9/2018 |
| JP | 2019016954 | 1/2019 |

OTHER PUBLICATIONS

"Written Opinion of the International Searching Authority (Form PCT/ISA/237) of PCT/JP2022/023584", mailed on Aug. 23, 2022, with English translation thereof, pp. 1-8.

* cited by examiner

FROM STEP S120

DETECT SUBJECT FROM MOVING IMAGE — S132

IS SUBJECT MOVING OBJECT? — S133

No → TO STEP S150

Yes

CALCULATE DISTANCE BETWEEN MOVING OBJECT AND STITCHING REGION — S134

CALCULATE TIME DURING WHICH MOVING OBJECT STAYS IN STITCHING REGION — S135

CALCULATE INDICATOR BASED ON DISTANCE AND TIME — S137

TO STEP S140

IMAGE PROCESSING APPARATUS, IMAGE PROCESSING SYSTEM, IMAGE PROCESSING METHOD, AND IMAGE PROCESSING PROGRAM

CROSS-REFERENCE TO RELATED APPLICATIONS

The present application is a Continuation of PCT International Application No. PCT/JP2022/023584 filed on Jun. 13, 2022 claiming priority under 35 U.S.C § 119(a) to Japanese Patent Application No. 2021-118738 filed on Jul. 19, 2021. Each of the above applications is hereby expressly incorporated by reference, in its entirety, into the present application.

BACKGROUND OF THE INVENTION

1. Field of the Invention

The present invention relates to an image processing apparatus, an image processing system, an image processing method, and an image processing program for processing a moving image.

2. Description of the Related Art

Regarding a technology for capturing a video, for example, JP2011-004340A describes that a warning is issued in a case where a composite defect of a panoramic image occurs. In addition, JP2018-142963A describes processing performed in a case where images of a short-distance view and a long-distance view appear at a boundary portion of a composite image.

SUMMARY OF THE INVENTION

One embodiment according to the present disclosed technology provides an image processing apparatus, an image processing system, an image processing method, and an image processing program for outputting a warning from an output device based on an indicator for concatenation of moving images.

According to a first aspect of the present invention, there is provided an image processing apparatus comprising: a processor, in which the processor is configured to perform: image acquisition processing of acquiring a plurality of moving images having overlapping imaging ranges; information acquisition processing of acquiring information on a stitching region to be used for concatenation of the plurality of moving images; indicator calculation processing of calculating an indicator based on a distance between a subject and a stitching line included in the stitching region; and warning processing of outputting a warning from an output device based on the indicator.

According to a second aspect of the present invention, in the image processing apparatus according to the first aspect, the processor is configured to perform determination processing of determining whether or not the subject is within the stitching region based on the indicator.

According to a third aspect, in the image processing apparatus according to the second aspect, the processor is configured to, in the warning processing, output the warning from the output device based on the determination processing.

According to a fourth aspect, in the image processing apparatus according to any one of the first to third aspects, the processor is configured to, in the indicator calculation processing, calculate a time during which the subject stays in the stitching region, and calculate the indicator based on the distance and the calculated time.

According to a fifth aspect, in the image processing apparatus according to any one of the first to fourth aspects, the processor is configured to, in the indicator calculation processing, calculate the indicator based on a size of the subject in the moving image.

According to a sixth aspect, in the image processing apparatus according to the fifth aspect, the processor is configured to determine the size of the subject based on a size of at least a region indicating a site of a person.

According to a seventh aspect, in the image processing apparatus according to any one of the first to sixth aspects, the processor is configured to, in the indicator calculation processing, determine whether or not the subject is a moving object, and calculate the indicator in a case where the subject is determined to be the moving object.

According to an eighth aspect, in the image processing apparatus according to the seventh aspect, the processor is configured to, in a case where a person is recognized, determine the person as the moving object.

According to a ninth aspect, in the image processing apparatus according to the seventh or eighth aspect, the processor is configured to, in the warning processing, output information indicating a direction in which the subject is to be moved.

According to a tenth aspect, in the image processing apparatus according to any one of the first to ninth aspects, the processor is configured to, in the information acquisition processing: acquire a common region among the plurality of moving images as the information on the stitching region; and set the stitching line in the stitching region based on a user's operation.

According to an eleventh aspect, in the image processing apparatus according to any one of the first to tenth aspects, the processor is configured to: add the information on the stitching region to the plurality of moving images displayed in a live view, in the information acquisition processing; and start recording the plurality of moving images after adding the information on the stitching region.

According to a twelfth aspect, in the image processing apparatus according to any one of the first to eleventh aspects, the processor is configured to perform combining processing of concatenating the plurality of moving images at the stitching region or the stitching line to generate a composite moving image.

According to a thirteenth aspect, in the image processing apparatus according to the twelfth aspect, the processor is configured to generate an all-around moving image in the combining processing.

According to a fourteenth aspect, in the image processing apparatus according to the thirteenth aspect, the processor is configured to display the composite moving image on a display device.

According to a fifteenth aspect of the present invention, there is provided an image processing system comprising: the image processing apparatus according to any one of the first to fourteenth aspects; an imaging device that captures the plurality of moving images; and the output device.

According to a sixteenth aspect, in the image processing system according to the fifteenth aspect, the output device outputs the warning through at least one of screen display, audio output, or vibration.

According to a seventeenth aspect of the present invention, there is provided an image processing method executed by an image processing apparatus including a processor, the image processing method comprising: causing the processor to execute: an image acquisition step of acquiring a plurality of moving images having overlapping imaging ranges; an information acquisition step of acquiring information on a stitching region to be used for concatenation of the plurality of moving images; an indicator calculation step of calculating an indicator based on a distance between a subject and a stitching line included in the stitching region; and a warning output step of outputting a warning from an output device based on the indicator.

According to an eighteenth aspect of the present invention, there is provided an image processing program for causing an image processing apparatus including a processor to execute an image processing method, the image processing method including: an image acquisition step of acquiring a plurality of moving images having overlapping imaging ranges; an information acquisition step of acquiring information on a stitching region to be used for concatenation of the plurality of moving images; an indicator calculation step of calculating an indicator based on a distance between a subject and a stitching line included in the stitching region; and a warning output step of outputting a warning for the subject from an output device.

DESCRIPTION OF THE PREFERRED EMBODIMENTS

[Elimination of Unnaturalness at Seam of Video]

Figure 6:
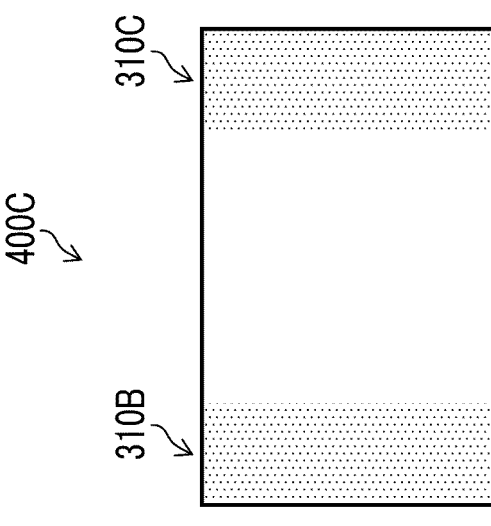
FIG. 6 is a diagram showing moving images captured by three cameras.
Figure 6:
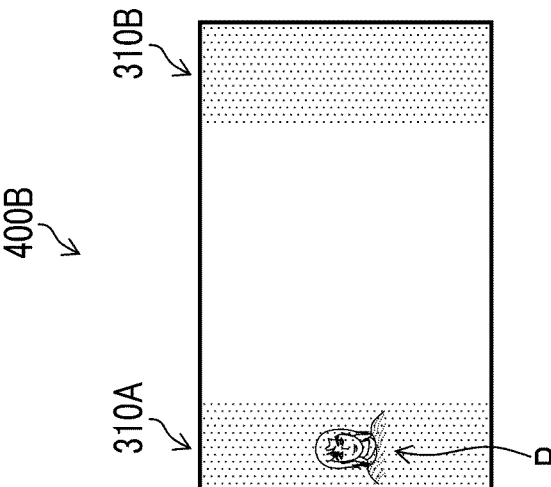
Figure 6:
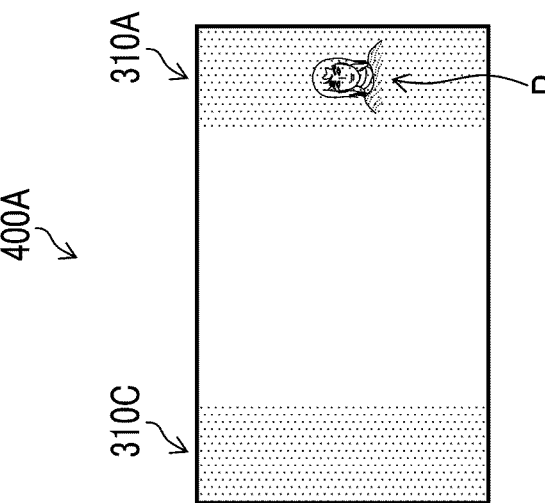

A user of an imaging device may want to capture a moving image over a wide range. For example, in a case of capturing an all-around moving image (a moving image acquired continuously without interruptions over an entire circumference (360 degrees) in a horizontal direction; also referred to as a "360-degree video"), there may be a case where a single wide-angle camera is used and a case where a plurality of cameras are used. In a case where it is desired to capture a high-image-quality video for professional use or commercial use, it is generally advantageous to use a plurality of cameras. However, in a case where the plurality of cameras are used, it is necessary to perform a process of concatenating a plurality of videos (combining moving images), which is called a stitch (or stitching). In this case, in the conventional technologies such as JP2011-004340A and JP2018-142963A described above, in a case where a subject (person P in FIG. 6, which will be described below) overlaps at seams as shown in FIG. 6, a composite video (moving image) may become an unnatural video in the vicinity of the seams, with the subject appearing distorted or shifted.

In view of such circumstances, the inventors of the present application have diligently conducted research and conceived the idea that "by calculating an indicator based on a distance between a subject and a stitching line and outputting a warning based on this indicator from an output device, it is possible to prevent the seams of the videos from becoming unnatural". Hereinafter, one embodiment of the invention based on this idea will be described in detail.

One embodiment of an image processing apparatus, an image processing system, an image processing method, and an image processing program according to the present invention is as follows. Descriptions will be made with reference to the accompanying drawings as necessary.

First Embodiment

[Overall Configuration of Image Processing System]

Figure 1:
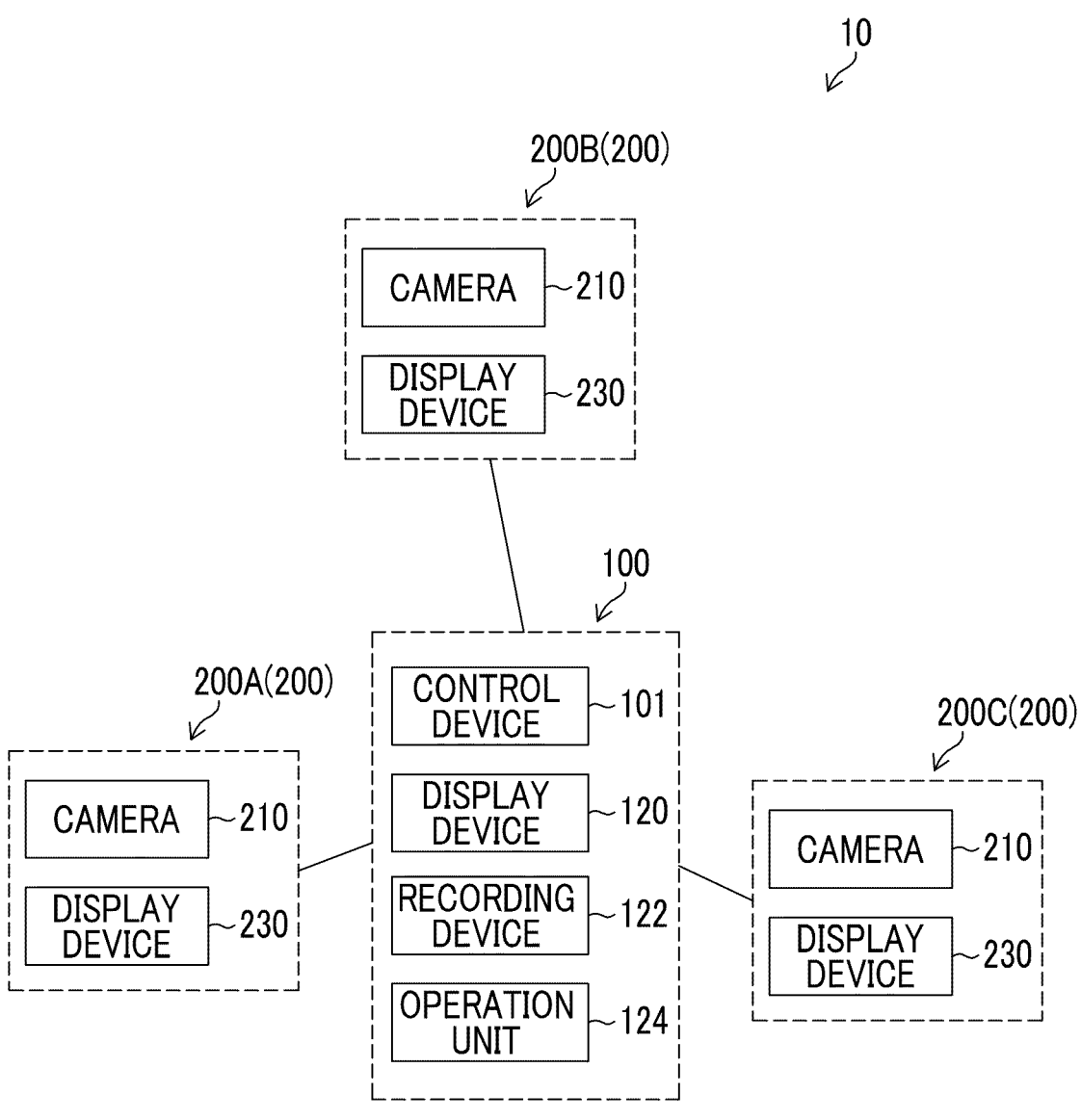
FIG. 1 is a diagram showing an overall configuration of an image processing system according to a first embodiment.

FIG. 1 is a diagram showing an overall configuration of an image processing system according to a first embodiment of the present invention. An image processing system 10 (image processing system) shown in FIG. 1 comprises a system controller 100 (image processing apparatus) and a plurality of camera units 200 (imaging devices), and as will be described in detail below, capturing a moving image, calculating an indicator, issuing a warning, generating or displaying a composite moving image, and the like are performed.

[Configurations of System Controller/Control Device]

Figure 2:
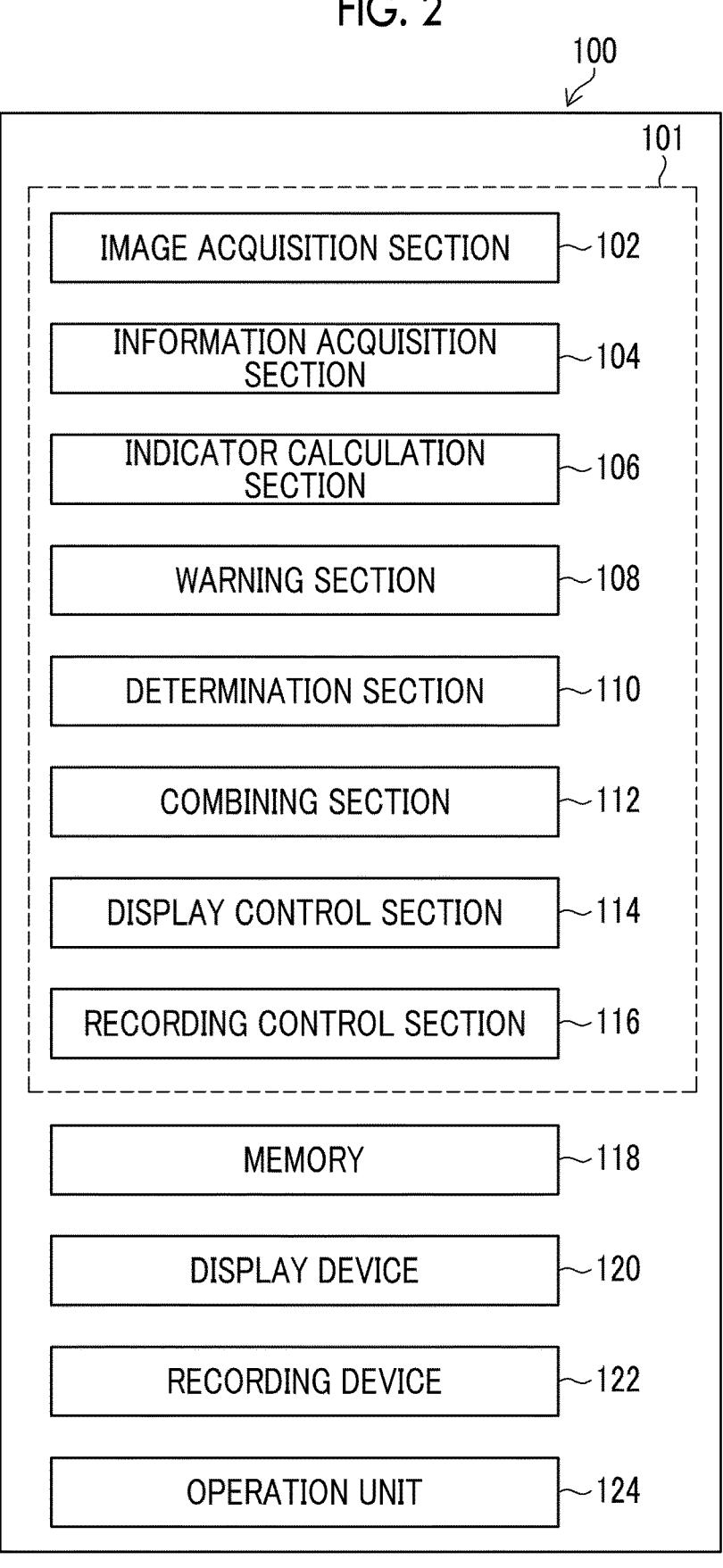
FIG. 2 is a diagram showing a configuration of a system controller and a functional configuration of a control device.

FIG. 2 is a diagram showing a configuration of the system controller 100 and a functional configuration of a control device 101. The system controller 100 has the control device 101 (processor, image processing apparatus), a memory 118, a display device 120 (output device), a recording device 122, and an operation unit 124. The control device 101 has, as functions thereof, an image acquisition section 102, an information acquisition section 104, an indicator calculation section 106, a warning section 108, a determination section 110, a combining section 112, a display control section 114, a recording control section 116. As will be described in detail below, the control device 101 performs various types of processing such as indicator calculation processing and warning processing, controlling the camera unit 200, and the like.

The above-described functions of the control device 101 can be realized using various processors. The various processors include, for example, a central processing unit (CPU) which is a general-purpose processor that executes software (programs) to realize various functions. In addition, the various processors described above include a graphics processing unit (GPU) which is a processor specialized in image processing. Further, the various processors described above also include a programmable logic device (PLD) which is a processor whose circuit configuration can be changed after manufacturing, such as a field programmable gate array (FPGA). Furthermore, the various processors described above also include a dedicated electrical circuit which is a processor having a dedicated circuit configuration designed to execute specific processing, such as an application specific integrated circuit (ASIC).

Each function of the control device 101 may be realized by one processor or may be realized by a plurality of processors. In addition, one processor may correspond to a plurality of functions. Further, each function of the control device 101 may be realized by a circuit, or a part of each function may be realized by a circuit and the rest may be realized by a processor.

In a case where the above-described processor or electrical circuit executes software (programs), a processor (computer) readable code of the software to be executed or data necessary for executing the software is stored on a non-transitory recording medium such as a flash memory, and the processor refers to the software or the data. The software stored on the non-transitory recording medium includes an image processing program for executing each step of the image processing method according to the present embodiment. The code or the data may be recorded on a non-transitory recording medium formed of various magneto-optical recording devices, a semiconductor memory, or the like, instead of the flash memory. Here, the "semiconductor memory" includes a read only memory (ROM) and an electronically erasable and programmable ROM (EEPROM) in addition to the flash memory. In a case of processing using the software, for example, a random access memory (RAM) is used as a temporary storage area. The memory 118 (memory) can be composed of a flash memory, a ROM, a RAM, an EEPROM, or the like and can be used as the non-transitory recording medium and the temporary storage area described above.

[Display Device, Recording Device, and Operation Unit]

The display device 120 is composed of a display device, such as a liquid crystal display, and performs display of the acquired moving image or composite moving image, output of a warning, and the like. The recording device 122 is composed of various magneto-optical recording devices or semiconductor recording devices, and a control device thereof, and records the acquired moving image, composite moving image, or the like. The operation unit 124 is composed of a device such as a mouse and a keyboard, and a user can perform operations necessary for executing the image processing method or the image processing program of the embodiment of the present invention via these devices.

[Configuration of Camera Unit]

The image processing system 10 comprises three camera units 200 (imaging devices, output devices). The camera unit 200 is connected to the system controller 100 and performs capturing of a moving image, transmission of the captured moving image to the system controller 100, output of a warning based on an indicator, and the like. Each of the camera units 200 comprises a camera 210 (imaging device) and a display device 230 (output device) and performs acquisition of a moving image, output of a warning, and the like. The display device 230 can be used to display a warning, and in this case, it is preferable to install the display device 230 in an orientation in which the subject can visually recognize the warning.

Although a case where the image processing system 10 comprises three camera units 200 has been described in FIG. 1, the image processing system of the embodiment of the present invention need only be able to acquire a plurality of moving images having overlapping imaging ranges, and the number of camera units may be two or four or more. In addition, although a case where each of the camera units 200 comprises the camera 210 and the display device 230 has been described in FIG. 1, the plurality of camera units 200 may share one display device 230.

In the first embodiment, the three camera units 200 (cameras 210) can have the same configuration, but in a case where it is necessary to distinguish between the camera units 200, the camera units will be described as "camera units 200A, 200B, and 200C" or "cameras 210A, 210B, and 210C".

[Configuration of Camera]

Figure 3:
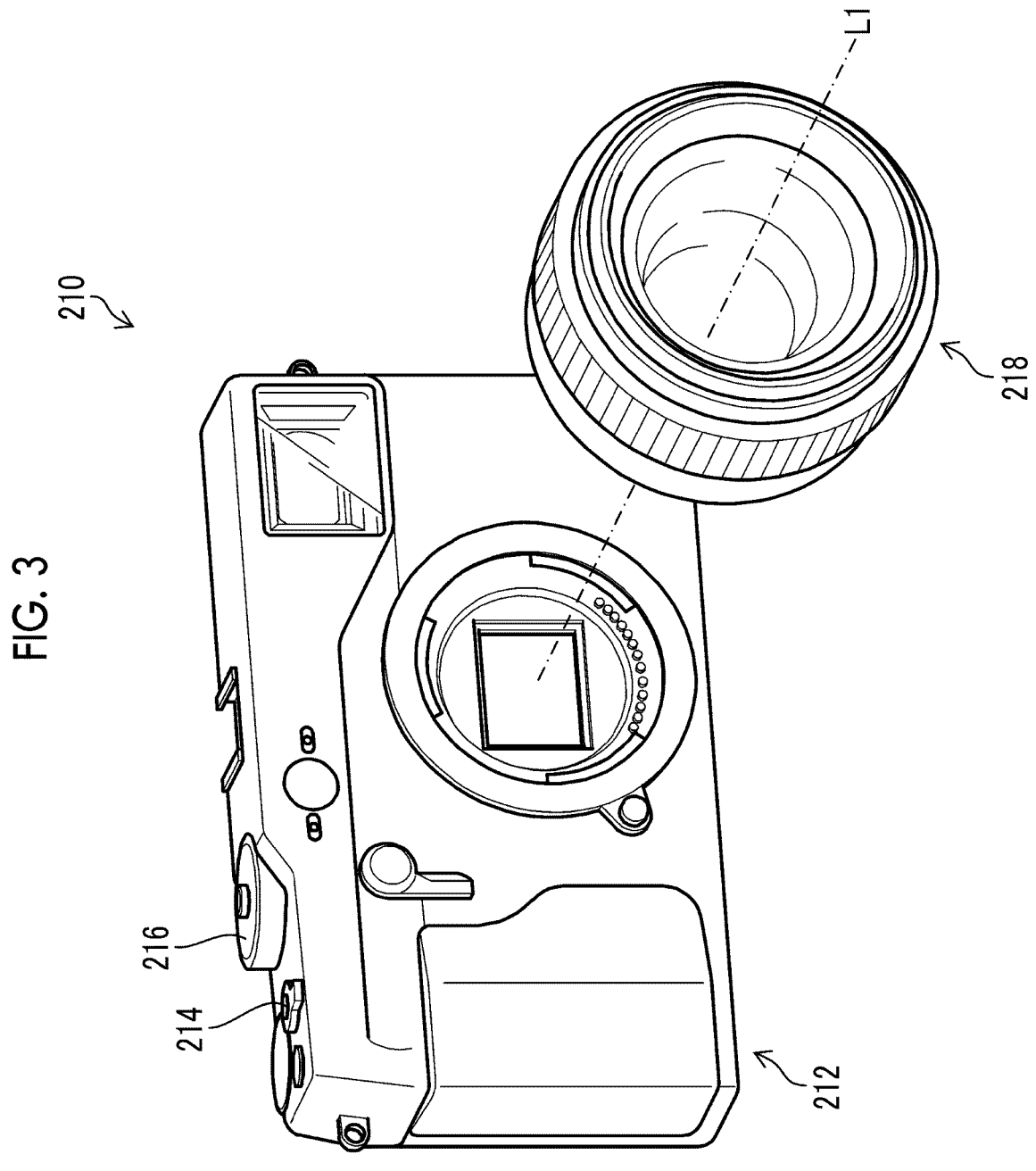
FIG. 3 is an external perspective view of a camera.
Figure 4:
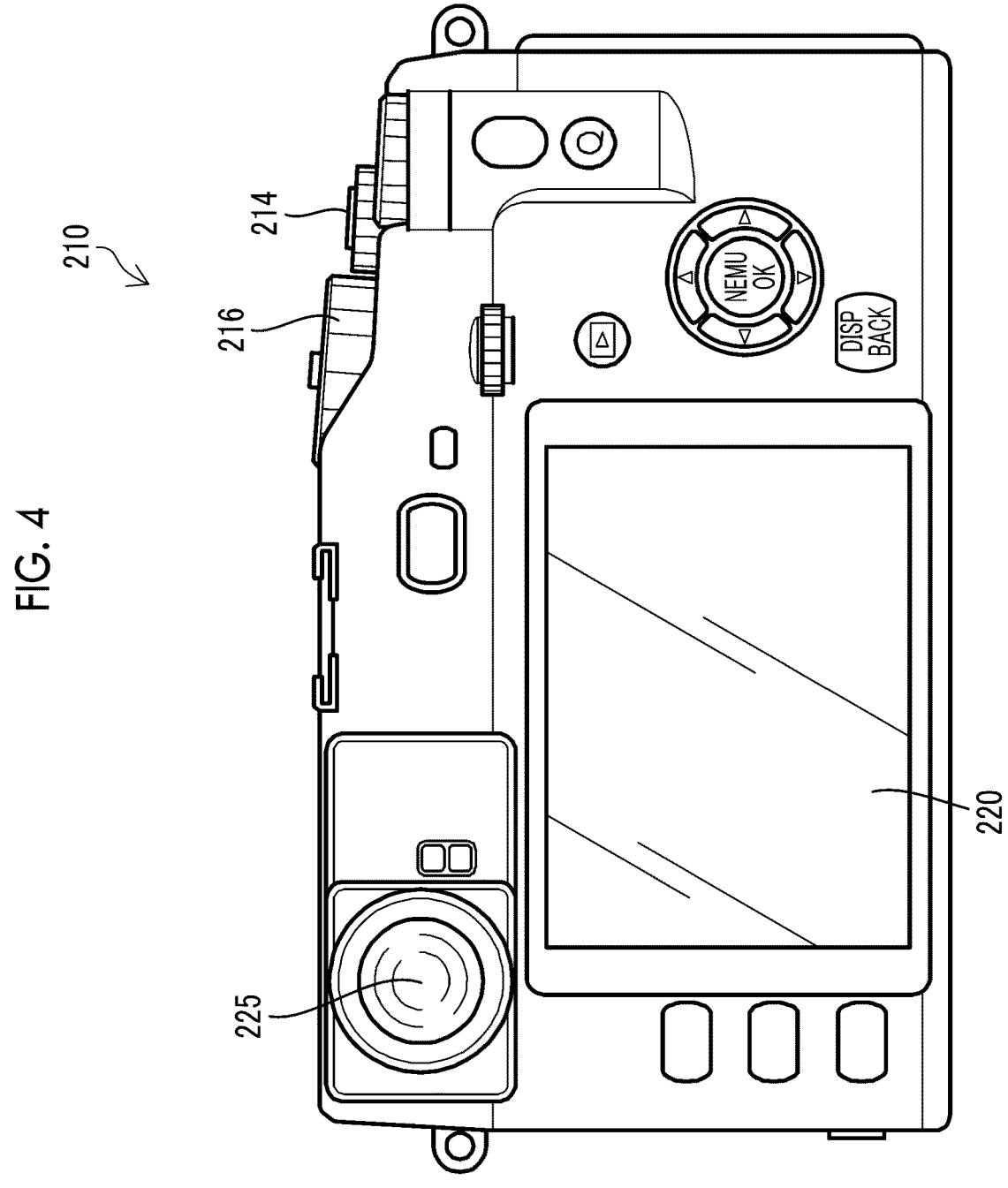
FIG. 4 is a rear view of the camera.

FIG. 3 is an external perspective view of the camera 210 (imaging device). As shown in FIG. 3, the camera 210 is composed of a camera body 212 and an interchangeable lens 218 (optical axis L1). A release button 214, a dial 216 for setting an imaging mode or a shutter speed, and the like are provided on an upper surface of the camera body 212. Meanwhile, FIG. 4 is a rear view of the camera 210. In addition to a monitor 220 (display device, output device), a finder eyepiece portion 225 and various buttons or switches are provided on a rear surface. The monitor 220 is a touch panel type display device formed of a liquid crystal display element or the like and can be used as a device that displays a moving image, receives a setting operation of a stitching line, or outputs (displays) a warning. The monitor 220 is not limited to a type of being fixed to the camera body 212, and a vari-angle type or tilt-type monitor capable of changing an orientation may be used to allow the subject to visually recognize the display of the monitor 220.

The camera body 212 is provided with an image sensor (not shown). The image sensor may be a complementary metal-oxide semiconductor (CMOS) type, a charge-coupled device (CCD) type, or other types. In addition, in the camera 210, each function (or a part thereof) of the image processing program of the embodiment of the present invention can be stored in a memory (not shown), and a processor (not shown) can perform processing in accordance with the image processing program. The processing in the camera 210 may be performed in response to the user's operation (such as pressing the release button 214, operating the monitor 220, or operating various buttons or switches) or may be performed by a processor (not shown) regardless of the user's operation. Further, the camera 210 may receive a command from the system controller 100, and the system controller 100 may control each unit of the camera 210 to perform various types of processing.

The camera 210 can be mounted on a tripod or a panhead (not shown). The tripod or the panhead may be a type that allows for the control of the camera 210 (such as a remote release function). Further, an electric tripod or panhead may be employed, and the system controller 100 may control the tripod or panhead (such as changing an imaging direction and controlling the imaging start or end)

The camera 210 shown in FIGS. 3 and 4 is an example of an imaging device constituting the image processing system, and an imaging device having a different configuration may be used. For example, a professional-use imaging device used for television broadcasting or the like may be used instead of the compact camera. Alternatively, a smartphone may be used as the imaging device.

The display device 230 (output device) is composed of a device such as a liquid crystal display and is connected to the camera 210, thereby displaying the moving image captured by the camera 210, outputting (displaying) a warning based on an indicator, or the like. The camera unit 200 may record the captured moving image on a recording device (not shown).

[Imaging Range and Stitching Region of Moving Image]

Figure 5:
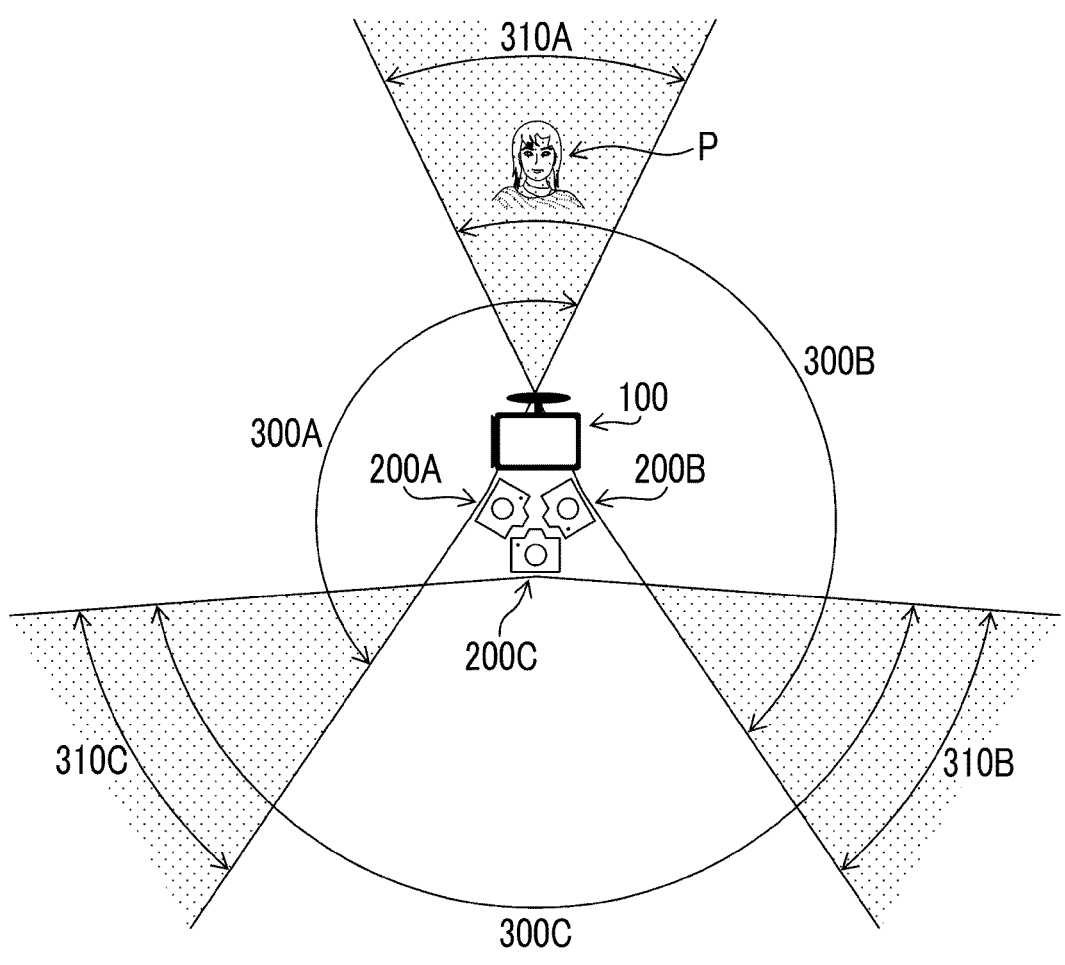
FIG. 5 is a diagram showing imaging ranges and stitching regions of moving images captured by three camera units.

FIG. 5 is a diagram showing imaging ranges and stitching regions of moving images captured by the three camera units 200A, 200B, and 200C, and is a diagram showing a state in which the camera units 200A, 200B, and 200C are viewed from vertically above. In FIG. 5, the imaging ranges of the camera units 200A, 200B, and 200C are imaging ranges 300A, 300B, and 300C, respectively, and the imaging ranges overlap within stitching regions 310A, 310B, and 310C (shaded regions in the drawing). With the camera units 200A, 200B, and 200C disposed in this manner, it is possible to acquire a plurality of moving images having overlapping imaging ranges.

FIG. 6 is a diagram showing moving images 400A, 400B, and 400C, which are moving image images captured by three cameras 210A, 210B, and 210C. As shown in FIG. 6, both end portions of these moving images are the stitching regions 310A, 310B, and 310C, and the person P (subject, moving object) is shown in the stitching region 310A.

[Basic Processing of Image Processing Method]

Figure 7:
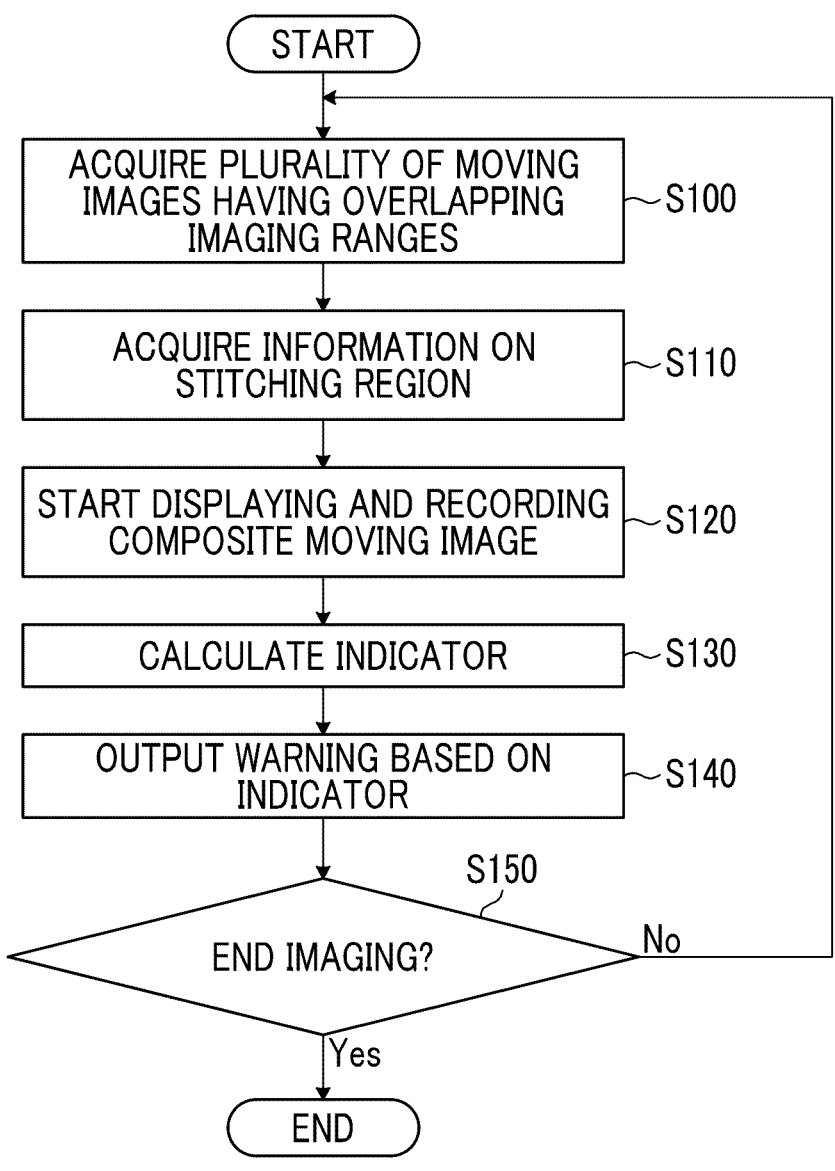
FIG. 7 is a flowchart showing a procedure of an image processing method according to the first embodiment.

FIG. 7 is a flowchart showing a procedure of the image processing method according to the first embodiment. This flowchart shows basic processing, and details of each processing will be described below. The image acquisition section 102 (processor) acquires a plurality of moving images having overlapping imaging ranges, which are captured by the camera units 200A, 200B, and 200C (cameras 210A, 210B, and 210C) (step S100: image acquisition processing, image acquisition step). The image acquisition section 102 may acquire these moving images in real time or may acquire a moving image that has already been captured.

The information acquisition section 104 (processor) acquires information on the stitching region to be used for concatenation of the plurality of moving images (step S110: information acquisition processing, information acquisition step). This processing can be performed based on a common region among the plurality of moving images. The combining section 112 (processor) generates a composite moving image by concatenating the plurality of moving images in the stitching region (step S120: combining processing, combining step). In a case where the camera unit 200 (camera 210) is disposed as shown in FIG. 5, the combining section 112 can generate an all-around moving image in step S120. Here, the "all-around moving image" is a moving image which is continuous (acquired without interruptions) over the entire circumference (360 degrees around a vertical axis) in the horizontal direction.

Further, in step S120, the display control section 114 (processor) causes the display device 120 (display device, output device) to display the composite moving image, and the recording control section 116 (processor) causes the recording device 122 to record the composite moving image. In the first embodiment, the system controller 100 (processor) may display or record the composite moving image in real time, or may record original moving images (three moving images captured by the cameras 210A, 210B, and 210C) in real time, and display or record the composite moving image afterward.

The indicator calculation section 106 (processor) calculates an indicator based on a distance between the subject and the stitching line (step S130: indicator calculation processing, indicator calculation step), and the warning section 108 (processor) outputs a warning based on the indicator (step S140: warning output processing, warning output step). The indicator calculation section 106 may calculate the distance as it is (for example, the number of pixels) between the subject and the stitching line as the indicator or may calculate another amount based on the distance as the indicator, as will be described below. The warning section 108 may perform screen display of warning messages on the display devices 230 (display devices, output devices) of the camera units 200A, 200B, and 200C, and may perform screen display of messages on the monitors 220 in a case where the monitors 220 (display devices, output devices) of the cameras 210A, 210B, and 210C are vari-angle types or tilt-types capable of changing display directions and the monitors 220 are directed toward the subject. The indicator calculation section 106 and the warning section 108 can perform the indicator calculation and the warning in real time.

Figure 8:
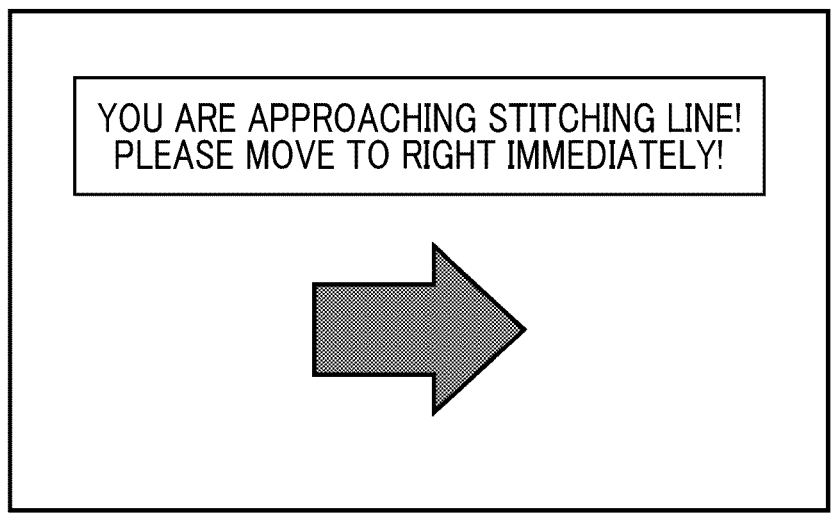
FIG. 8 is a diagram showing an example of a warning message.

FIG. 8 is a diagram showing an example of the warning message. In the example shown in FIG. 8, an arrow as an example of "information indicating a direction in which the subject is to be moved" is displayed in addition to a message such as "you are approaching the stitching line!". Through this display (warning), as will be described below, in a case where the subject is a moving object such as a person, the subject can easily move from the vicinity of the stitching region in an appropriate direction.

The indicator calculation and the warning output described above may be performed for all frames of the moving image, or may be performed (intermittently) for some frames.

The control device 101 (processor) repeats the above-described processing until the imaging is ended (YES in step S150). The control device 101 can end the imaging in a case where there is an imaging end operation (for example, an operation on a predetermined button, switch, or the like) on the camera 210 or the control device 101. In a case where the information on the stitching region has already been acquired (in a case where the stitching line has already been set) in repeating the processing, the processing of step S110 may be skipped.

[Details of Information Acquisition Processing]

Figure 9:
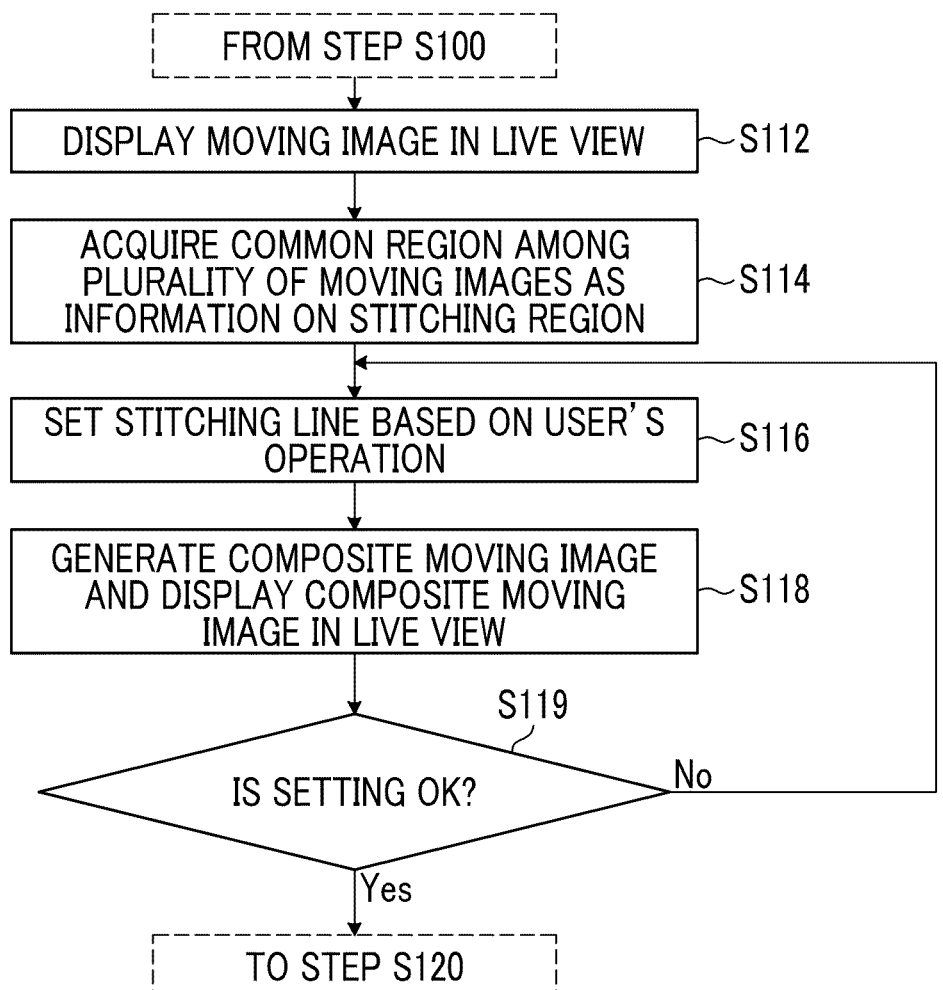
FIG. 9 is a flowchart showing details of information acquisition processing and an information acquisition step.

FIG. 9 is a flowchart showing details of the information acquisition processing and the information acquisition step (step S110 of FIG. 7). The information acquisition section 104 (processor) acquires, for a plurality of moving images displayed in a live view on the monitor 220 or the display device 120 (step S112), a common region among the plurality of moving images as information on the stitching region (step S114). This "information" is the position and the size of the stitching region in the moving image, for example, as shown in FIG. 6.

Figure 10:
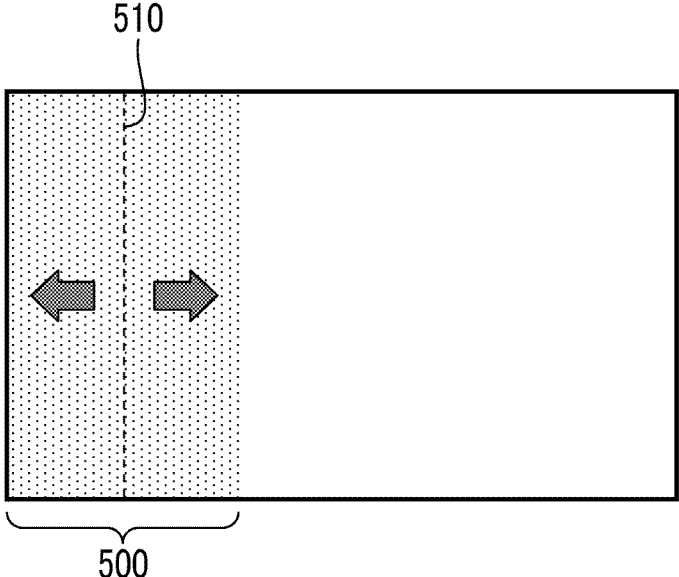
FIG. 10 is a diagram showing a state in which a stitching line is set.

The information acquisition section 104 sets a stitching line in the stitching region based on the user's operation (step S116). For example, as shown in FIG. 10, the user can operate a touch panel constituting the monitor 220 to move a stitching line 510 (displayed by a dotted line in the drawing) in a stitching region 500 of the moving image displayed on the monitor 220 to the left and right (in directions of arrows in the drawing) inside the stitching region 500 (including a boundary line) (move the stitching line included in the stitching region). Instead of the left and right moving operation, the user may perform an operation of tracing the monitor 220 from top to bottom (or from bottom to top) with a finger, a touch pen, or the like. The information acquisition section 104 can set the stitching line in the moving image (or determine the stitching line included in the stitching region) based on such an operation on the camera 210 (the cameras 210A, 210B, and 210C). In a case where the information on the stitching region cannot be appropriately acquired (for example, in a case where the fields of view of the cameras 210 do not overlap) or in a case where the stitching line cannot be appropriately set (in a case where the user attempts to set the stitching line outside the stitching region), the information acquisition section 104 may output a warning from the display device 120 or the like.

The stitching line may be set according to an operation performed on a system controller 100 side, instead of an operation on the camera 210 as described above. For example, it is considered that the display control section 114 (processor) causes the display device 120 (display device) to display the moving image acquired by the camera 210 in a live view (step S112), and the user performs an operation of setting the stitching line in the moving image by operating the operation unit 124 (such as a keyboard, a mouse, or a touch panel) in the same manner as in the example of FIG. 10. The information acquisition section 104 can set the stitching line in the moving image based on such the user's operation (step S116).

[Combining of Moving Images]

The combining section 112 (processor) can combine a plurality of moving images (generate a composite moving image) by concatenating the moving images at the stitching region or the stitching line, and the display control section 114 can cause the display device to display the composite moving image in a live view (step S118). The display control section 114 may display the composite moving image on any one of the display device 120, the monitor 220, or the display device 230, or may display the composite moving image on a plurality of devices. Through such a live view display, the user can confirm the combined moving image on the spot (before the recording start).

Figures 11A, 11B:
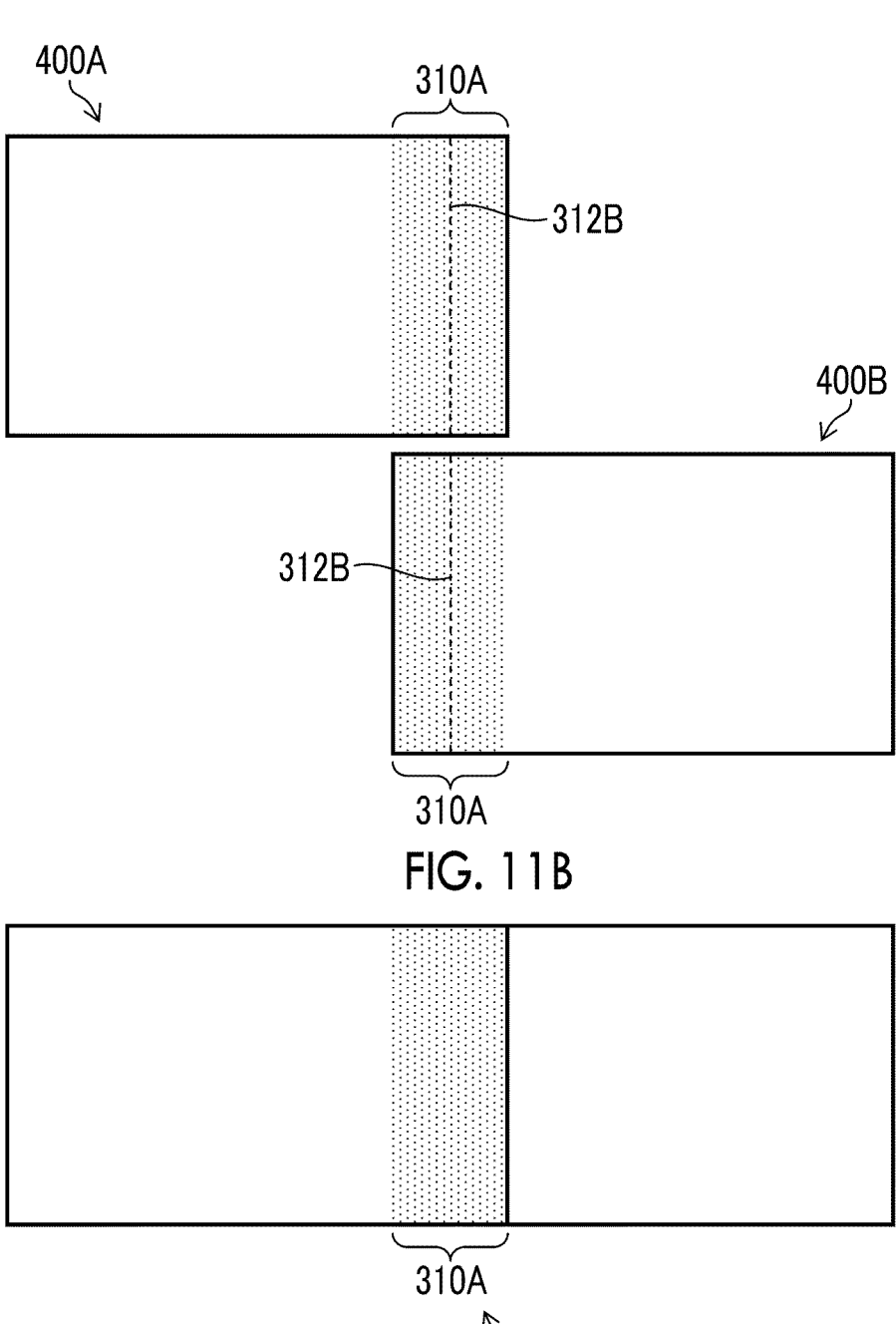
FIGS. 11A and 11B are conceptual diagrams showing an example of composite moving image generation.

FIGS. 11A and 11B are conceptual diagrams showing an example of composite moving image generation (an example of concatenating a plurality of moving images in the stitching regions), and show a state in which the moving images 400A and 400B among the three moving images shown in FIG. 6 are combined. FIG. 11A shows a state in which the stitching regions 310A are present at the end portions of the moving images 400A and 400B, respectively, and stitching lines 312B are set in the stitching regions. For such moving images 400A and 400B, as shown in FIG. 11B, the combining section 112 (processor) can generate a composite moving image 410 (composite moving image) by overlapping the stitching regions 310A of the moving images such that the stitching lines 312B match with each other. In this case, the combining section 112 can perform weighting addition of the two moving images 400A and 400B in the stitching region.

Figure 12A:
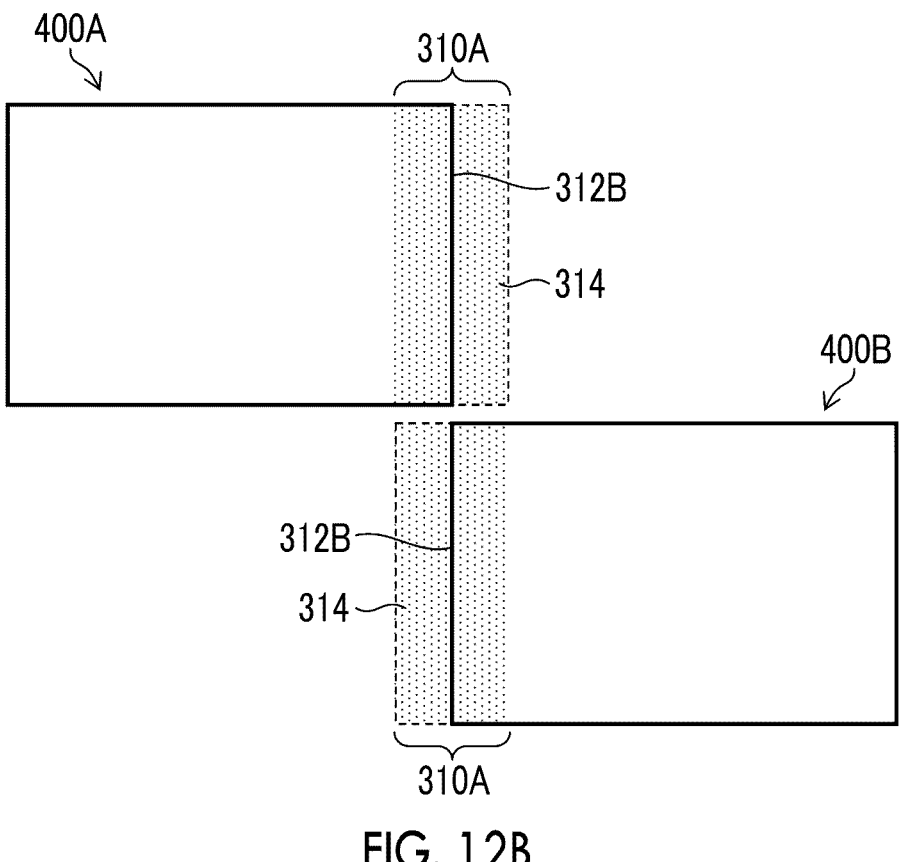
FIGS. 12A and 12B are conceptual diagrams showing another example of the composite moving image generation.
Figure 12B:
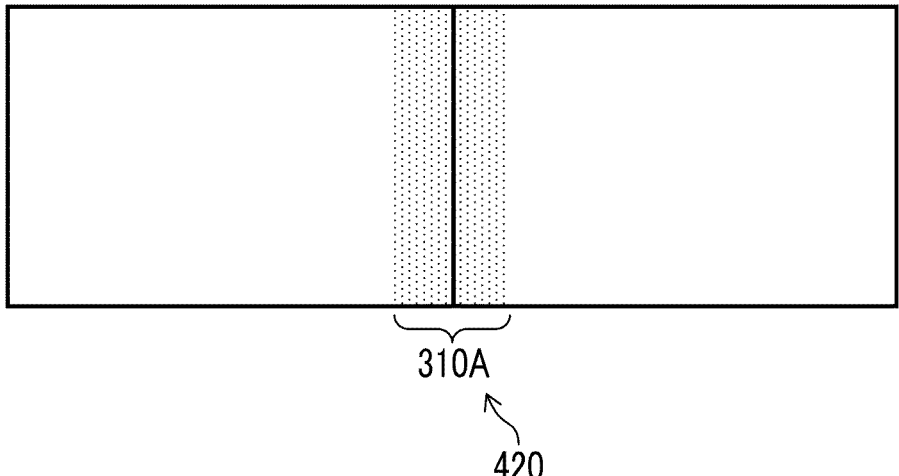

FIGS. 12A and 12B are conceptual diagrams showing another example of the composite moving image generation (an example of concatenating a plurality of moving images at the stitching line). In this example, the combining section 112 trims regions 314 (of which boundaries are indicated by dotted lines) located at the end portions with respect to the stitching lines 312B of the moving images 400A and 400B as shown in FIG. 12A, and aligns the stitching lines 312B with each other (matches the stitching lines 312B with each other), thereby generating a composite moving image 420 shown in FIG. 12B. That is, it can also be said that "the weight of the image composition is I/O with the stitching line 312 as the boundary".

The combining section 112 can generate the composite moving image by performing the processing illustrated in FIGS. 11A, 11B, 12A, and 12B on the plurality of moving images having overlapping imaging ranges. In the situations shown in FIGS. 5 and 6, the processing is performed on the moving images 400A, 400B, and 400C, whereby an all-around moving image can be generated as the composite moving image.

After confirming the composite moving image displayed in a live view, the user can operate the operation unit 124, the monitor 220, or the like in a case where the setting of the stitching line or the like is OK. In a case where an operation indicating that the setting is OK, such as pressing a predetermined button or switch, is performed (YES in step S119), the recording control section 116 (processor) starts recording the plurality of moving images and the composite moving image after the information on the stitching region is added, in response to this operation (step S120 of FIG. 7).

[Indicator Calculation for Moving Object]

Figure 13:
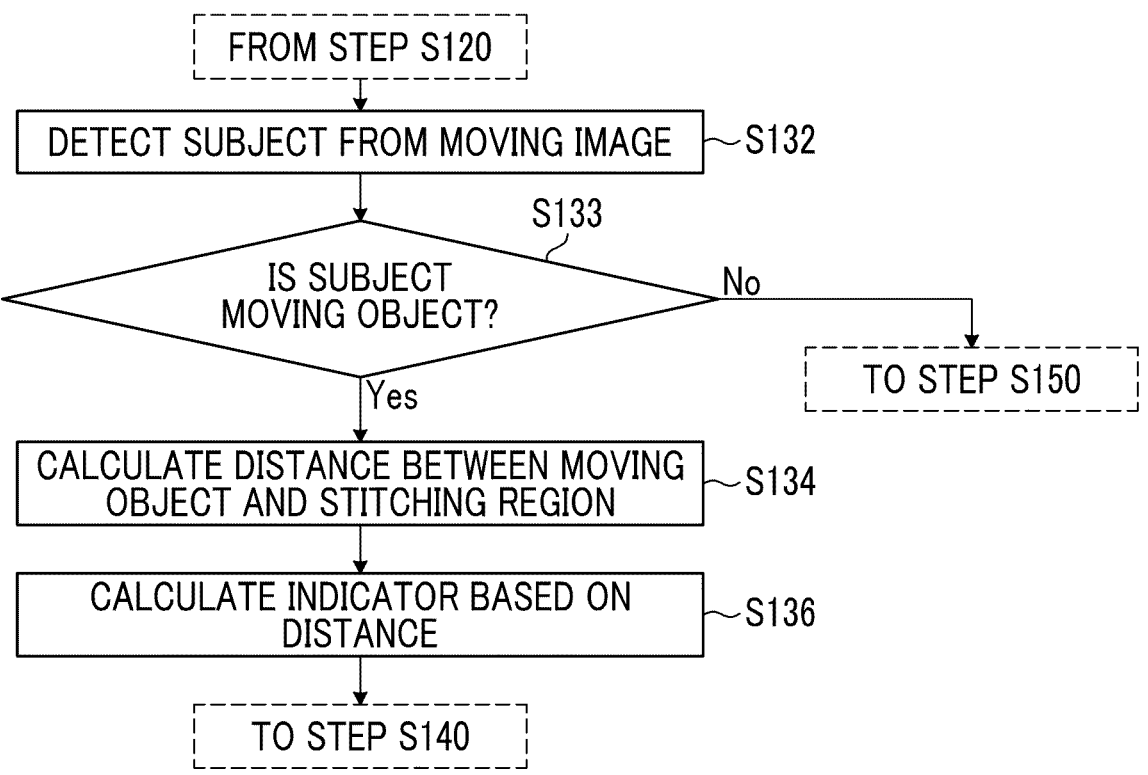
FIG. 13 is a flowchart showing a procedure of indicator calculation for a moving object.

In the first embodiment, in the indicator calculation processing (step S130 of FIG. 7), the indicator may be calculated based on whether or not the subject is the moving object. For example, as shown in the flowchart of FIG. 13, the indicator calculation section 106 (processor) determines whether or not the subject is the moving object (step S133), and may perform distance calculation and indicator calculation (steps S134 and S136) in a case where the subject is the moving object (YES in step S133). Here, the indicator calculation section 106 performs discrimination (detection, classification) of the subject through, for example, image processing on the acquired moving image, and can determine that "the subject is the moving object" in a case where the subject is a predetermined type of subject. For such discrimination of the subject, a discriminator configured by machine learning such as deep learning, for example, a hierarchical neural network, can be used.

The subject as the moving object can move according to a warning, and such a subject is set as a target for the indicator calculation or the warning, so that it is possible to efficiently restrain the subject from staying in the vicinity of the stitching region (or in the vicinity of the stitching line), which makes it possible to prevent the seams of the videos from becoming unnatural.

Examples of the "subject as the moving object" can include a person. The indicator calculation section 106 may detect the person by using a known face detection technique. Since the person easily recognizes the warning and moves, it is effective to set the person as the target for the indicator calculation or the warning in order to prevent the seams of the videos from becoming unnatural.

It should be noted that, in the present invention, the "subject as the moving object" is not limited to a person. The subject may be not only the person but also vehicles, drones, other flying objects, movable robots, and machinery (for example, movable or transformable cranes). These subjects may be objects that are autonomously movable or may be objects that are movable through a remote operation or the like.

[Warning Output Based on Indicator]

Figure 14:
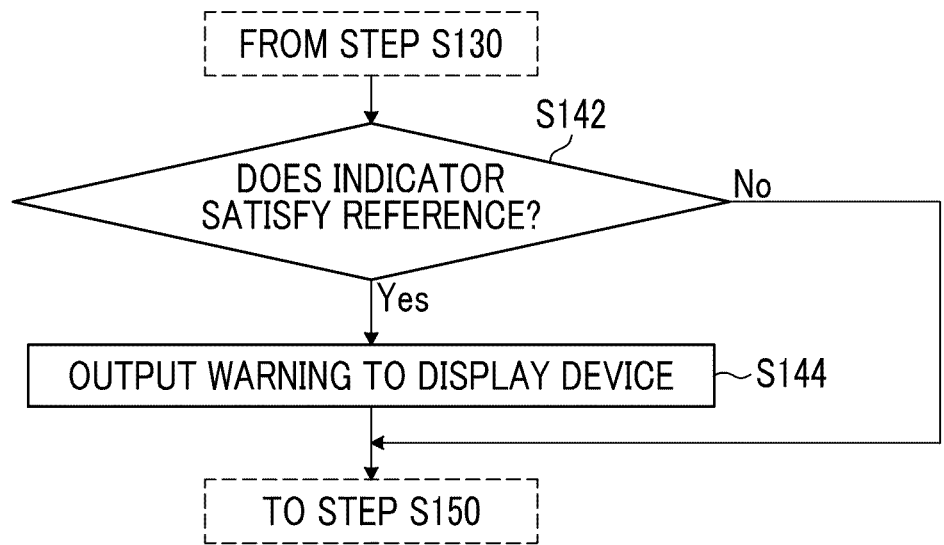
FIG. 14 is a flowchart showing a procedure of warning output based on an indicator.

FIG. 14 is a flowchart showing a procedure of warning output (step S140 of FIG. 7) based on the indicator. The warning section 108 (processor) determines whether or not the indicator calculated in step S130 satisfies a reference (step S142: determination processing, determination step), and can output a warning from the display device 230 or the like (output device) (step S144) in a case where the reference is satisfied (in a case where a determination result is YES). In step S142, the warning section 108 may determine "whether or not the subject is within the stitching region" based on the indicator or may determine "whether or not the indicator is equal to or greater than a threshold value". In the determination, the warning section 108 may use a statistic value of the indicator (for example, a minimum value, a maximum value, an average value, or the like of the indicator in a predetermined period).

As described above, according to the first embodiment, it is possible to restrain the subject from staying in the vicinity of the stitching region through the warning based on the indicator, which makes it possible to prevent the seams of the videos from becoming unnatural.

[Modification Example]

Modification examples of the present invention will be described below.

[Indicator Calculation Based on Distance and Time]

Figure 15:
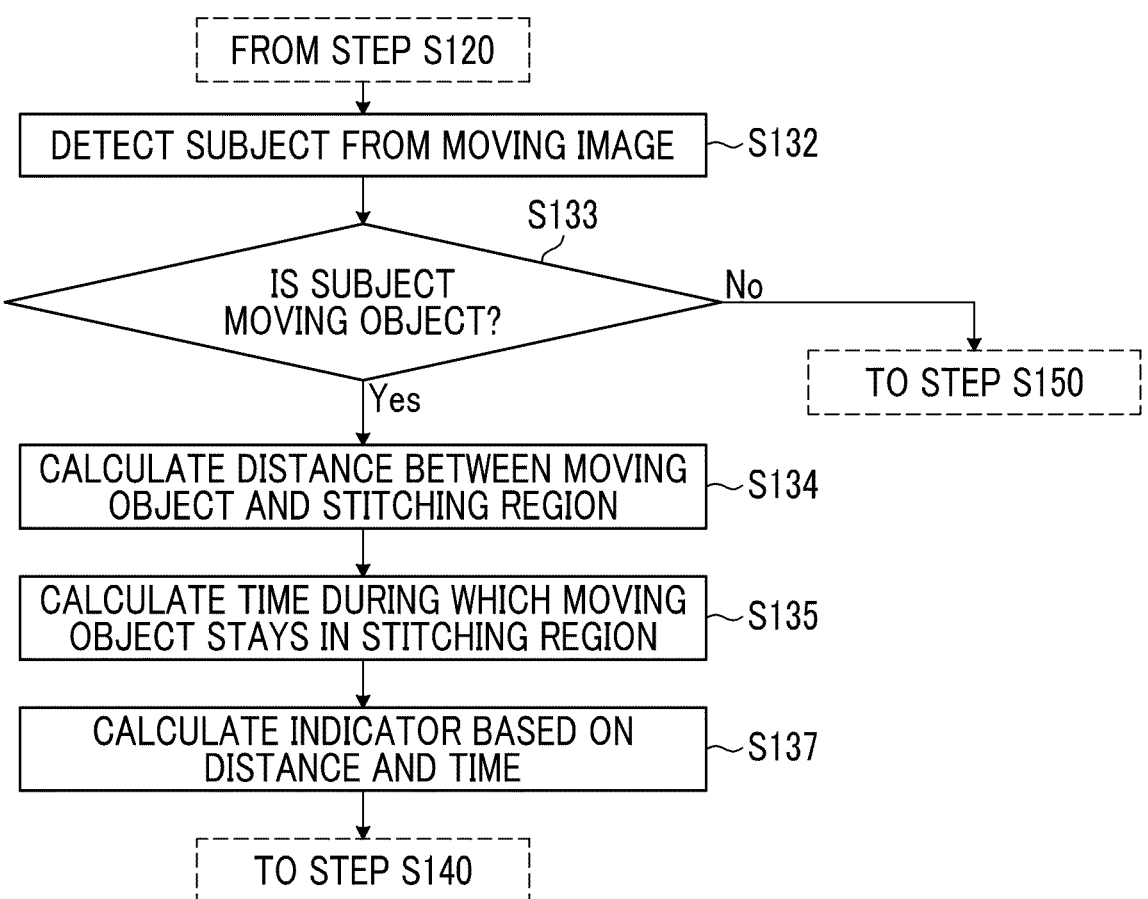
FIG. 15 is a flowchart showing a procedure of indicator calculation based on a distance and a time.

In the first embodiment, an aspect in which the indicator is calculated based on the distance between the subject and the stitching region has been described (refer to FIG. 13), but in the present invention, the indicator may be calculated by further taking into consideration the time during which the subject remains in the stitching region. FIG. 15 is a flowchart showing a procedure of indicator calculation based on the distance and the time. Since the processing up to step S134 is the same as that of FIG. 13, the same step numbers are designated, and detailed description thereof will be omitted.

Figure 16:
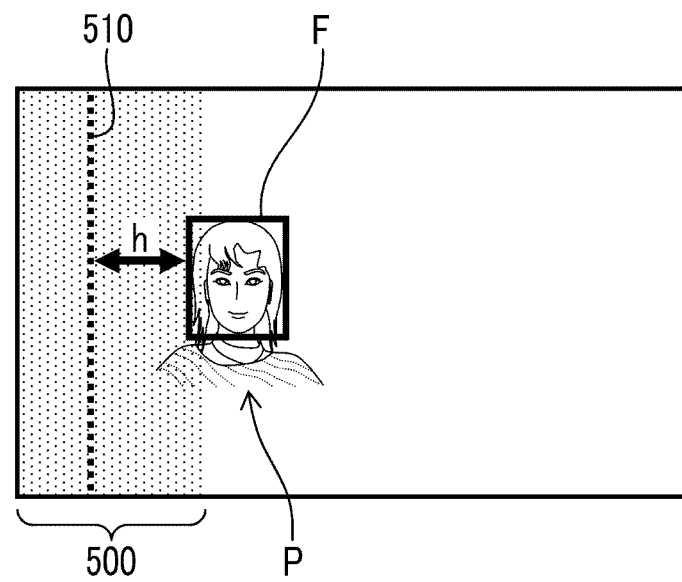
FIG. 16 is a diagram showing a state in which a subject, which is a person, stays in a vicinity of the stitching line.

The indicator calculation section 106 (processor) can calculate the time (dwell time) during which the subject stays in the stitching region (step S135: indicator calculation processing, indicator calculation step), and can calculate the indicator based on this time and the distance calculated in step S134 (step S137: indicator calculation processing, indicator calculation step). Here, as shown in FIG. 16, it is assumed that the person P (subject, moving object) and the stitching line 510 are at a distance h (pixels) (in the drawing, the size of the subject is represented by a face detection frame F; which will be described below).

For example, by multiplying "the number of frames in which the person P is shown in the stitching region among frames constituting the moving image" by a "frame interval (a reciprocal of the frame rate)", the indicator calculation section 106 can calculate the time (dwell time; time t) during which the person P stays in the stitching region, and the indicator can be calculated using Equation (1) based on this time t and the distance h.

$$\text{Indicator}=t\times(1/h) \tag{1}$$

As is clear from Equation (1), the longer the dwell time is and the shorter the distance is, the larger the indicator is.

The indicator calculation section 106 may perform weighting by multiplying "t" and/or "1/h" by coefficients as in Equation (2).

$$\text{Indicator}=(\alpha\times t)\times\{(\beta\times(1/h)\} \tag{2}$$

(where, $\alpha$ and $\beta>0$)

The warning section 108 (processor) can output a warning from the output device based on the indicator calculated using Equation (1) or (2) (step S140 of FIG. 7; warning processing, warning step).

[Indicator Calculation Based on Distance and Size of Subject]

Figure 17:
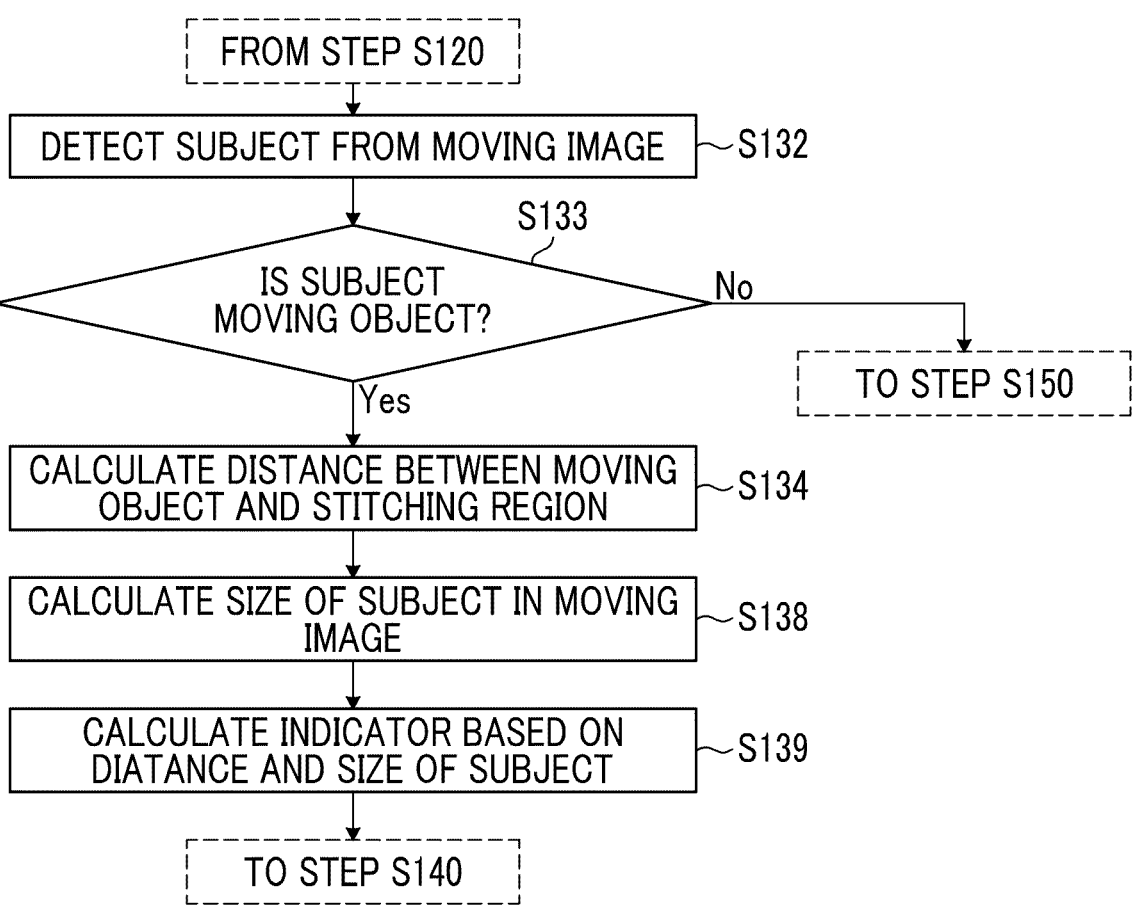
FIG. 17 is a flowchart showing a procedure of indicator calculation based on the distance and a size of the subject.

In the present invention, the indicator may be calculated further based on the size of the subject in the moving image in addition to the distance between the subject and the stitching region. For example, as shown in the flowchart of FIG. 17, the indicator calculation section 106 (processor) can calculate the size of the subject in the moving image (step S138: indicator calculation processing, indicator calculation step) and can calculate the indicator based on the distance between the subject and the stitching line and the size of the subject in the moving image (step S139: indicator calculation processing, indicator calculation step).

In step S138, the indicator calculation section 106 may determine, in a case where the subject is a person, the size of the subject based on the size of a region indicating the site of the person in the moving image. As "the size of the region indicating the site of the person in the moving image", for example, as shown in FIG. 16, the size of the face detection frame F of the person P can be used. In the situation as shown in FIG. 16, the fact that "the face detection frame F is large" means that the distance between the camera 210 and the person P is close, and there is a probability that the person P may cross the stitching line through even a slight movement. Therefore, such a situation can be restrained by calculating the indicator based on "the size of the region indicating the site of the person in the moving image" such as the face detection frame F, and outputting a warning. Instead of such a face detection frame, the indicator calculation section 106 may determine the size of the subject based on the size of a bounding box that surrounds the entire person (entire subject) in the moving image.

The indicator calculation section 106 may calculate the indicator based on three points: the distance between the subject and the stitching region; the time during which the subject stays in the stitching region; and the size of the subject in the moving image.

[Others]

[Regarding Moving Image to be Captured/Combined]

In the first embodiment, a case where the moving image is acquired (captured) for the entire circumference and an all-around moving image is generated (combined) has been described, but the acquisition and the generation of the moving image in the present invention are not limited to such an aspect. In the present invention, a plurality of moving images having overlapping imaging ranges need only be acquired, and for example, two camera units may be used to capture two moving images, or four or more camera units may be used to capture and combine moving images. Further, the composite moving image to be generated may not necessarily be the all-around moving image but may be a moving image covering a part in a circumferential direction (for example, 120 degrees or 180 degrees). According to the present invention, even in such an aspect, it is possible to restrain the video from becoming unnatural at the seams of the moving images.

[Other Output Aspects of Warning]

In the first embodiment, the screen display of the warning message or the like is performed on the monitor 220 or the display device 230 (refer to the example of FIG. 8), but in the present invention, the warning output is not limited to such an aspect. The warning section 108 (processor) can output a warning by turning on or off a light source (output device) (not shown) instead of or in addition to the output of the warning message. In this case, the warning section 108 can change the speed of blinking based on the indicator (for example, blink faster for a larger indicator) and can change the color of the light source (for example, emit red light in a case where the indicator is larger and emit blue light in a case where the indicator is smaller).

In addition, the warning section 108 can output a warning through audio output or vibration instead of or in addition to such screen display. For example, a device (output device) such as a smartphone, an earphone-type device, a goggle-type device, or a wristwatch-type device can be carried or worn by the subject as a moving object such as a person, and the warning section 108 (system controller 100, processor) can control these devices to output the warning through at least one of screen display, audio output, or vibration. In this case, audio can be output from earphones or a speaker (output device), or vibration can be output through the operation of an electronic component or a mechanical component (output device). The warning section 108, similar to the case of the screen display described above, can change the volume or change the pitch of the sound based on the indicator (for example, increase the volume and/or increase the pitch of the sound in a case where the indicator is large, and decrease the volume and/or lower the pitch of the sound in a case where the indicator is small). The warning section 108 can output a direction in which the subject is to be moved even in a case where a warning is output through these devices.

Even in a case where the warning is output in this way, the subject as the moving object can recognize the warning and move similar to the first embodiment, and as a result, it is possible to restrain the video from becoming unnatural at the seams of the moving images.

The embodiments of the present invention have been described above, but the present invention is not limited to the above-described aspects, and various modifications can be made without departing from the spirit of the present invention.

EXPLANATION OF REFERENCES

10: image processing system
100: system controller
101: control device
102: image acquisition section
104: information acquisition section
106: indicator calculation section
108: warning section
110: determination section
112: combining section
114: display control section
116: recording control section
118: memory
120: display device
122: recording device
124: operation unit
200: camera unit
200A: camera unit
200B: camera unit
200C: camera unit
210: camera
210A: camera
210B: camera
210C: camera
212: camera body
214: release button
216: dial
218: interchangeable lens
220: monitor
225: finder eyepiece portion
230: display device
300A: imaging range
300B: imaging range 300C: imaging range
310A: stitching region
310B: stitching region
310C: stitching region
312: stitching line
312B: stitching line
314: region
400A: moving image
400B: moving image
400C: moving image
410: composite moving image
420: composite moving image
500: stitching region
510: stitching line
F: face detection frame
h: distance
L1: optical axis
P: person
S100 to S150: each step of image processing method

What is claimed is:

1. An image processing apparatus comprising:
a processor,
wherein the processor is configured to perform:
image acquisition processing of acquiring a plurality of moving images having overlapping imaging ranges;
information acquisition processing of acquiring information on a stitching region to be used for concatenation of the plurality of moving images;
indicator calculation processing of calculating an indicator based on a distance between a subject and a stitching line included in the stitching region, a size of the subject in the stitching region, and a time during which the subject stays in the stitching region; and
warning processing of outputting a warning from an output device based on the indicator having exceeded a threshold.

2. The image processing apparatus according to claim 1, wherein the processor is configured to perform determination processing of determining whether or not the subject is within the stitching region based on the indicator.

3. The image processing apparatus according to claim 2, wherein the processor is configured to, in the warning processing, output the warning from the output device based on the determination processing.

4. The image processing apparatus according to claim 1, wherein the processor is configured to determine the size of the subject based on a size of at least a region indicating a site of a person.

5. The image processing apparatus according to claim 1, wherein the processor is configured to, in the indicator calculation processing, determine whether or not the subject is a moving object, and calculate the indicator in a case where the subject is determined to be the moving object.

6. The image processing apparatus according to claim 5, wherein the processor is configured to, in a case where a person is recognized, determine the person as the moving object.

7. The image processing apparatus according to claim 5, wherein the processor is configured to, in the warning processing, output information indicating a direction in which the subject is to be moved.

8. The image processing apparatus according to claim 1, wherein the processor is configured to, in the information acquisition processing:

acquire a common region among the plurality of moving images as the information on the stitching region; and set the stitching line in the stitching region based on a user's operation.

9. The image processing apparatus according to claim 1, wherein the processor is configured to:

add the information on the stitching region to the plurality of moving images displayed in a live view, in the information acquisition processing; and start recording the plurality of moving images after adding the information on the stitching region.

10. The image processing apparatus according to claim 1, wherein the processor is configured to perform combining processing of concatenating the plurality of moving images at the stitching region or the stitching line to generate a composite moving image.

11. The image processing apparatus according to claim 10, wherein the processor is configured to generate an all-around moving image in the combining processing.

12. The image processing apparatus according to claim 11, wherein the processor is configured to display the composite moving image on a display device.

13. An image processing system comprising:

the image processing apparatus;

an imaging device that captures the plurality of moving images; and the output device, wherein the image processing apparatus comprises:

a processor configured to perform:

image acquisition processing of acquiring a plurality of moving images having overlapping imaging ranges;

information acquisition processing of acquiring information on a stitching region to be used for concatenation of the plurality of moving images;

indicator calculation processing of calculating an indicator based on a distance between a subject, a size of the subject in the stitching region, and a stitching line included in the stitching region and a time during which the subject stays in the stitching region; and warning processing of outputting a warning from an output device based on the indicator having exceeded a threshold.

14. The image processing system according to claim 13, wherein the output device outputs the warning through at least one of screen display, audio output, or vibration.

15. An image processing method executed by an image processing apparatus including a processor, the image processing method comprising:

causing the processor to execute:

an image acquisition step of acquiring a plurality of moving images having overlapping imaging ranges;

an information acquisition step of acquiring information on a stitching region to be used for concatenation of the plurality of moving images;

an indicator calculation step of calculating an indicator based on a distance between a subject, a size of the subject in the stitching region, and a stitching line included in the stitching region and a time during which the subject stays in the stitching region; and a warning output step of outputting a warning from an output device based on the indicator having exceeded a threshold.

16. A non-transitory, computer-readable tangible recording medium on which a program for causing, when read by a computer, the computer to execute the image processing method according to claim 15 is recorded.

* * * * *